United States Patent
Wu et al.

(10) Patent No.: US 8,456,115 B2
(45) Date of Patent: Jun. 4, 2013

(54) METHOD AND SYSTEM FOR CONTROLLING AN ELECTRIC MOTOR WITH VARIABLE SWITCHING FREQUENCY AT VARIABLE OPERATING SPEEDS

(75) Inventors: Long Wu, Fargo, ND (US); Robert Shaw, Moorhead, MN (US)

(73) Assignee: Deere & Company, Moline, IL (US)

( * ) Notice: Subject to any disclaimer, the term of this patent is extended or adjusted under 35 U.S.C. 154(b) by 161 days.

(21) Appl. No.: 13/170,216

(22) Filed: Jun. 28, 2011

(65) Prior Publication Data
US 2012/0212167 A1 Aug. 23, 2012

Related U.S. Application Data

(60) Provisional application No. 61/445,632, filed on Feb. 23, 2011.

(51) Int. Cl.
*H02P 6/14* (2006.01)
(52) U.S. Cl.
USPC ....... 318/400.13; 318/800; 318/758; 318/808
(58) Field of Classification Search
USPC .................. 318/400.13, 599, 685, 55, 90, 91, 318/92
See application file for complete search history.

(56) References Cited

U.S. PATENT DOCUMENTS

| | | | |
|---|---|---|---|
| 4,023,083 A | 5/1977 | Plunkett | |
| 4,047,083 A | 9/1977 | Plunkett | |
| 4,291,368 A | 9/1981 | Yarema et al. | |
| 4,814,677 A | 3/1989 | Plunkett | |
| 4,849,871 A | 7/1989 | Wallingford | |
| 5,428,283 A | 6/1995 | Kalman et al. | |
| 5,486,748 A | 1/1996 | Konrad et al. | |
| 5,703,459 A * | 12/1997 | Yasohara et al. | 318/808 |
| 5,914,582 A | 6/1999 | Takamoto et al. | |
| 6,275,000 B1 | 8/2001 | Nishimura | |
| 7,045,988 B2 | 5/2006 | Ha et al. | |
| 7,157,878 B2 | 1/2007 | Collier-Hallman | |
| 7,170,255 B2 * | 1/2007 | Hofmann et al. | 318/400.02 |
| 7,294,988 B2 | 11/2007 | Ajima et al. | |
| 7,733,044 B2 | 6/2010 | Nakamura et al. | |
| 2006/0247829 A1 | 11/2006 | Sato | |
| 2009/0237015 A1 * | 9/2009 | Hashimoto et al. | 318/400.02 |
| 2010/0165674 A1 | 7/2010 | Dai et al. | |
| 2012/0286716 A1 * | 11/2012 | Ohsugi | 318/494 |

OTHER PUBLICATIONS

US 7,595,604, 09/2009, Tomigashi (withdrawn)

* cited by examiner

*Primary Examiner* — Bentsu Ro
*Assistant Examiner* — Said Bouziane (57) ABSTRACT

A data processor establishes a first range of rotational speeds of a rotor of the motor from a first lower limit to a first higher limit and a second range of rotational speeds from a second lower limit to a second higher limit. A hysteresis band or a rotational range of speeds is established such that during operation in the first range the first higher limit is adjusted (e.g., raised by a first amount to be greater than the second lower limit). A sensor detects or measures a rotational speed of a rotor of the motor. The data processor determines whether the measured rotational speed falls within the first range or the second range, as adjusted by the hysteresis band, to identify a selected speed range. A switching frequency of a pulse-width modulation signal is varied in accordance with the selected speed range.

22 Claims, 6 Drawing Sheets

METHOD AND SYSTEM FOR CONTROLLING AN ELECTRIC MOTOR WITH VARIABLE SWITCHING FREQUENCY AT VARIABLE OPERATING SPEEDS

This document claims priority based on U.S. provisional application Ser. No. 61/445,632, filed on 23 Feb. 2011 and entitled METHOD AND SYSTEM FOR CONTROLLING AN ELECTRIC MOTOR WITH VARIABLE SWITCHING FREQUENCY AT VARIABLE OPERATING SPEEDS, under 35 U.S.C. 119(e).

FIELD OF THE INVENTION

This invention relates to a method and system for controlling an electric motor with variable switching frequency (e.g., pulse width modulation frequency) at variable operating speeds of a motor shaft.

BACKGROUND OF THE INVENTION

An electric motor may feature a rotor with permanent magnets and a stator, such as an interior permanent magnet (IPM) motor or an IPM synchronous motor. Application of the motor to a vehicle traction often requires a wide speed range of motor control. Although, to some extent, motor control performance can be increased with an increase in pulse width modulation switching frequency provided by the inverter, an excessively high switching frequency increases inverter switching losses, reduces inverter life from thermal impact, and increases the data processing burden of the data processor or digital signal processor within the inverter. Thus, there is a need for a method and system for controlling an electric motor with a wide varying operating speed such that a balanced or optimum pulse width modulation frequency is selected for the inverter.

SUMMARY OF THE INVENTION

In accordance with one embodiment, a method and system is presented for controlling an electric motor. A data processor establishes a first range of rotational speeds of a rotor of the motor from a first lower limit to a first higher limit. A data processor establishes a second range of rotational speeds of the rotor from a second lower limit to a second higher limit. A hysteresis band or a rotational range of speeds is established such that during operation in the first range the first higher limit is adjusted (e.g., raised by a first amount to be greater than the second lower limit). A sensor detects or measures a rotational speed of a rotor of the motor. The data processor determines whether the measured rotational speed falls within the first range or the second range, as adjusted by the hysteresis band, to identify a selected speed range. The data processor, the PWM module, or the inverter circuit varies a switching frequency of a pulse-width modulation signal in accordance with the selected speed range.

DESCRIPTION OF THE PREFERRED EMBODIMENT

Figure 1:
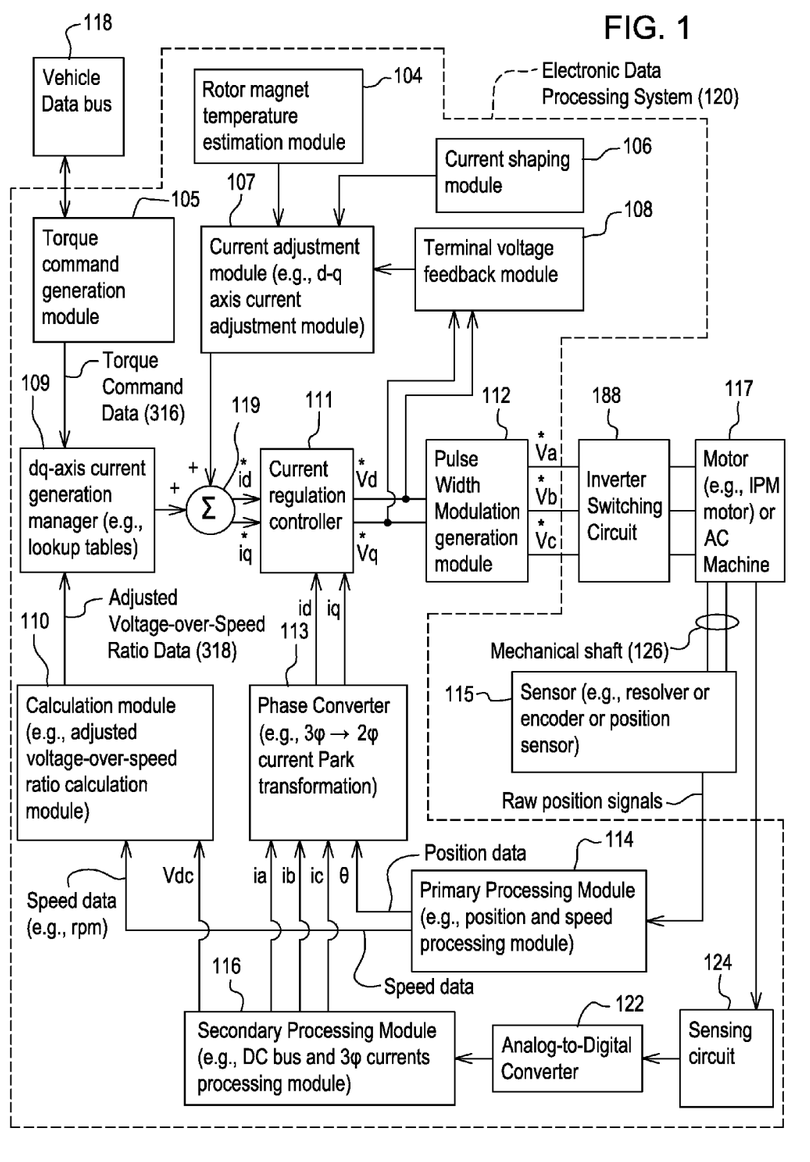
FIG. 1 is a block diagram of one embodiment of a system for controlling an electrical motor with variable speed control.

In accordance with one embodiment, FIG. 1 discloses system for controlling a motor 117 (e.g., an interior permanent magnet (IPM) motor) or another alternating current machine. The method and system described in this document can be equally applied to, interior permanent magnet motors, induction machines, or surfaced mounted permanent magnet (PM) machines with wide operating speeds. In one embodiment, the system, aside from the motor 117, may be referred to as an inverter or a motor controller. The system or inverter is well-suited for a widely varying operating speed of the motor shaft such that a balanced or optimum pulse width modulation frequency is selected for the inverter in one or more different speed ranges.

The system comprises electronic modules, software modules, or both. In one embodiment, the motor controller comprises an electronic data processing system 120 to support storing, processing or execution of software instructions of one or more software modules. The electronic data processing system 120 is indicated by the dashed lines in FIG. 1 and is shown in greater detail in FIG. 2.

The data processing system 120 is coupled to an inverter circuit 188. The inverter circuit 188 comprises a semiconductor drive circuit that drives or controls switching semiconductors (e.g., insulated gate bipolar transistors (IGBT) or other power transistors) to output control signals for the motor 117. In turn, the inverter circuit 188 is coupled to the motor 117. The motor 117 is associated with a sensor 115 (e.g., a position sensor, a resolver or encoder position sensor) that is associated with the motor shaft 126 or the rotor. The sensor 115 and the motor 117 are coupled to the data processing system 120 to provide feedback data (e.g., current feedback data, such as $i_a$, $i_b$, $i_c$), raw position signals, among other possible feedback data or signals, for example. Other possible feedback data includes, but is not limited to, winding temperature readings, semiconductor temperature readings of the inverter circuit 188, three phase voltage data, or other thermal or performance information for the motor 117.

In one embodiment, the torque command generation module 105 is coupled to a d-q axis current generation manager 109 (e.g., d-q axis current generation look-up tables). D-q axis current refers to the direct axis current and the quadrature axis current as applicable in the context of vector-controlled alternating current machines, such as the motor 117. The output of the d-q axis current generation manager 109 and the output of a current adjustment module 107 (e.g., d-q axis current adjustment module 107) are fed to a summer 119. In turn, one or more outputs (e.g., direct axis current data ($i_d^*$) and quadrature axis current data ($i_q^*$)) of the summer 119 are provided or coupled to a current regulation controller 111.

The current regulation controller 111 is capable of communicating with the pulse-width modulation (PWM) generation module 112 (e.g., space vector PWM generation module). The current regulation controller 111 receives respective d-q axis current commands (e.g., $i_d^*$ and $i_q^*$) and actual d-q axis currents (e.g., $i_d$ and $i_q$) and outputs corresponding d-q axis voltage commands (e.g., $v_d^*$ and $v_q^*$ commands) for input to the PWM generation module 112.

In one embodiment, the PWM generation module 112 converts the direct axis voltage and quadrature axis voltage data from two phase data representations into three phase representations (e.g., three phase voltage representations, such as $v_a^*$, $v_b^*$ and $v_c^*$) for control of the motor 117, for example. Outputs of the PWM generation module 112 are coupled to the inverter 188.

The inverter circuit 188 comprises power electronics, such as switching semiconductors to generate, modify and control pulse-width modulated signals or other alternating current signals (e.g., pulse, square wave, sinusoidal, or other waveforms) applied to the motor 117. The PWM generation module 112 provides inputs to a driver stage within the inverter circuit 188. An output stage of the inverter circuit 188 provides a pulse-width modulated signal, an alternating current signal, a pulse-width modulated voltage waveform, or other voltage signal for control of the motor. In one embodiment, the inverter 188 is powered by a direct current (DC) voltage bus.

The motor 117 is associated with a sensor 115 (e.g., a resolver, encoder, speed sensor, or another position sensor or speed sensor) that estimates at least one of an angular position of the motor shaft 126, a speed or velocity of the motor shaft 126, and a direction of rotation of the motor shaft 126. The sensor 115 may be mounted on or integral with the motor shaft 126. The output of the sensor 115 is capable of communication with the primary processing module 114 (e.g., position and speed processing module). In one embodiment, the sensor 115 may be coupled to an analog-to-digital converter (not shown) that converts analog position data or velocity data to digital position or velocity data, respectively. In other embodiments, the sensor 115 (e.g., digital position encoder) may provide a digital data output of position data or velocity data for the motor shaft 126 or rotor.

A first output (e.g., position data and speed data for the motor 117) of the primary processing module 114 is communicated to the phase converter 113 (e.g., three-phase to two-phase current Park transformation module) that converts respective three-phase digital representations of measured current into corresponding two-phase digital representations of measured current. A second output (e.g., speed data) of the primary processing module 114 is communicated to the calculation module 110 (e.g., adjusted voltage over speed ratio module).

An input of a sensing circuit 124 is coupled to terminals of the motor 117 for sensing at least the measured three-phase currents and a voltage level of the direct current (DC) bus (e.g., high voltage DC bus which may provide DC power to the inverter circuit 188). An output of the sensing circuit 124 is coupled to an analog-to-digital converter 122 for digitizing the output of the sensing circuit 124. In turn, the digital output of the analog-to-digital converter 122 is coupled to the secondary processing module 116 (e.g., Direct current (DC) bus and three phase current processing module). For example, the sensing circuit 124 is associated with the motor 117 for measuring three phase currents (e.g., current applied to the windings of the motor 117, back EMF induced into the windings, or both).

Certain outputs of primary processing module 114 and the secondary processing module 116 feed the phase converter 113. For example, the phase converter 113 may apply a Park transformation or other conversion equations (e.g., certain conversion equations that are suitable are known to those of ordinary skill in the art) to convert the measured three-phase representations of current into two-phase representations of current based on the digital three-phase current data from the secondary processing module 116 and position data from the sensor 115. The output of the phase converter 113 module is coupled to the current regulation controller 111.

Other outputs of the primary processing module 114 and the secondary processing module 116 may be coupled to inputs of the calculation module 110 (e.g., adjusted voltage over-speed ratio calculation module). For example, the primary processing module 114 may provide speed data (e.g., motor shaft 126 revolutions per minute), whereas the secondary processing module 116 may provide a measured level of direct current voltage (e.g., on the direct current (DC) bus of a vehicle). The direct current voltage level on the DC bus that supplies the inverter circuit 188 with electrical energy may fluctuate or vary because of various factors, including, but not limited to, ambient temperature, battery condition, battery charge state, battery resistance or reactance, fuel cell state (if applicable), motor load conditions, respective motor torque and corresponding operational speed, and vehicle electrical loads (e.g., electrically driven air-conditioning compressor). The calculation module 110 is connected as an intermediary between the secondary processing module 116 and the dq-axis current generation manager 109. The output of the calculation module 110 can adjust or impact current commands generated by the d-q axis current generation manager 109 to compensate for fluctuation or variation in direct current bus voltage, among other things.

The rotor magnet temperature estimation module 104, the current shaping module 106, and the terminal voltage feedback module 108 are coupled to or are capable of communicating with the dq-axis current adjustment module 107. In turn, the d-q axis current module 107 may communicate with the dq-axis current generation manager or the summer 119.

The rotor magnet temperature module 104 estimates or determines the temperature of the rotor permanent magnet or magnets. In one embodiment, the rotor magnet temperature estimation module 104 may estimate the temperature of the rotor magnets from internal control variables calculation, one or more sensors located on the stator, in thermal communication with the stator, or secured to the housing of the motor 117.

In one alternate embodiment, the rotor magnet temperature estimation module 104 may be replaced by or may estimate the temperature of the rotor magnets from one or more sensors located on the stator, in thermal communication with the stator, or secured to the housing of the motor 117.

In another alternative embodiment, the rotor magnet temperature estimation module 104 may be replaced with a temperature detector (e.g., a thermistor or infrared thermal sensor coupled to a wireless transmitter) mounted on the rotor or the magnet, where the detector provides a signal (e.g., wireless signal) indicative of the temperature of the magnet or magnets.

In one embodiment, the method or system may operate in the following manner. The torque command generation module 105 receives an input control data message, such as a speed control data message, a voltage control data message, or a torque control data message, over a vehicle data bus 118. The torque command generation module 105 converts the received input control message into torque control command data 316.

The d-q axis current generation manager 109 selects or determines the direct axis current command data and the quadrature axis current command data associated with respective torque control command data and respective detected motor shaft 126 speed data. For example, the d-q axis current generation manager 109 selects or determines the direct axis current command, the quadrature axis current command by accessing one or more of the following: (1) a look-up table, database or other data structure that relates respective torque commands to corresponding direct and quadrature axes currents, (2) a set of quadratic equations or linear equations that relate respective torque commands to corresponding direct and quadrature axes currents, or (3) a set of rules (e.g., if-then rules) that relates respective torque commands to corresponding direct and quadrature axes currents. The sensor 115 on the motor 117 facilitates provision of the detected speed data for the motor shaft 126, where the primary processing module 114 may convert position data provided by the sensor 115 into speed data.

The current adjustment module 107 (e.g., d-q axis current adjustment module) provides current adjustment data to adjust the direct axis current command data and the quadrature axis current command data based on input data from the rotor magnet temperature estimation module 104, the current shaping module 106, and terminal voltage feedback module 108.

The current shaping module 106 may determine a correction or preliminary adjustment of the quadrature axis (q-axis) current command and the direct axis (d-axis) current command based on one or more of the following factors: torque load on the motor 117 and speed of the motor 117, for example. The rotor magnet temperature estimation module 104 may generate a secondary adjustment of the q-axis current command and the d-axis current command based on an estimated change in rotor temperature or an estimated change in magnetic field strength of the rotor magnets with respect to a characterized rotor temperature or magnetic field strength at a known ambient temperature under known operational conditions, for example. The terminal voltage feedback module 108 may provide a third adjustment to the d-axis and q-axis current based on controller voltage command versus voltage limit. The current adjustment module 107 may provide an aggregate current adjustment that considers one or more of the following adjustments: a preliminary adjustment, a secondary adjustment, and a third adjustment.

The sensor 115 (e.g., shaft or rotor speed detector) may comprise one or more of the following: a direct current motor, an optical encoder, a magnetic field sensor (e.g., Hall Effect sensor), magneto-resistive sensor, and a resolver (e.g., a brushless resolver). In one configuration, the sensor 115 comprises a position sensor, where position data and associated time data are processed to determine speed or velocity data for the motor shaft 126. In another configuration, the sensor 115 comprises a speed sensor, or the combination of a speed sensor and an integrator to determine the position of the motor shaft.

In yet another configuration, the sensor 115 comprises an auxiliary, compact direct current generator that is coupled mechanically to the motor shaft 126 of the motor 117 to determine speed of the motor shaft 126, where the direct current generator produces an output voltage proportional to the rotational speed of the motor shaft 126. In still another configuration, the sensor 115 comprises an optical encoder with an optical source that transmits a signal toward a rotating object coupled to the shaft 126 and receives a reflected or diffracted signal at an optical detector, where the frequency of received signal pulses (e.g., square waves) may be proportional to a speed of the motor shaft 126. In an additional configuration, the sensor 115 comprises a resolver with a first winding and a second winding, where the first winding is fed with an alternating current, where the voltage induced in the second winding varies with the frequency of rotation of the rotor.

Figure 2:
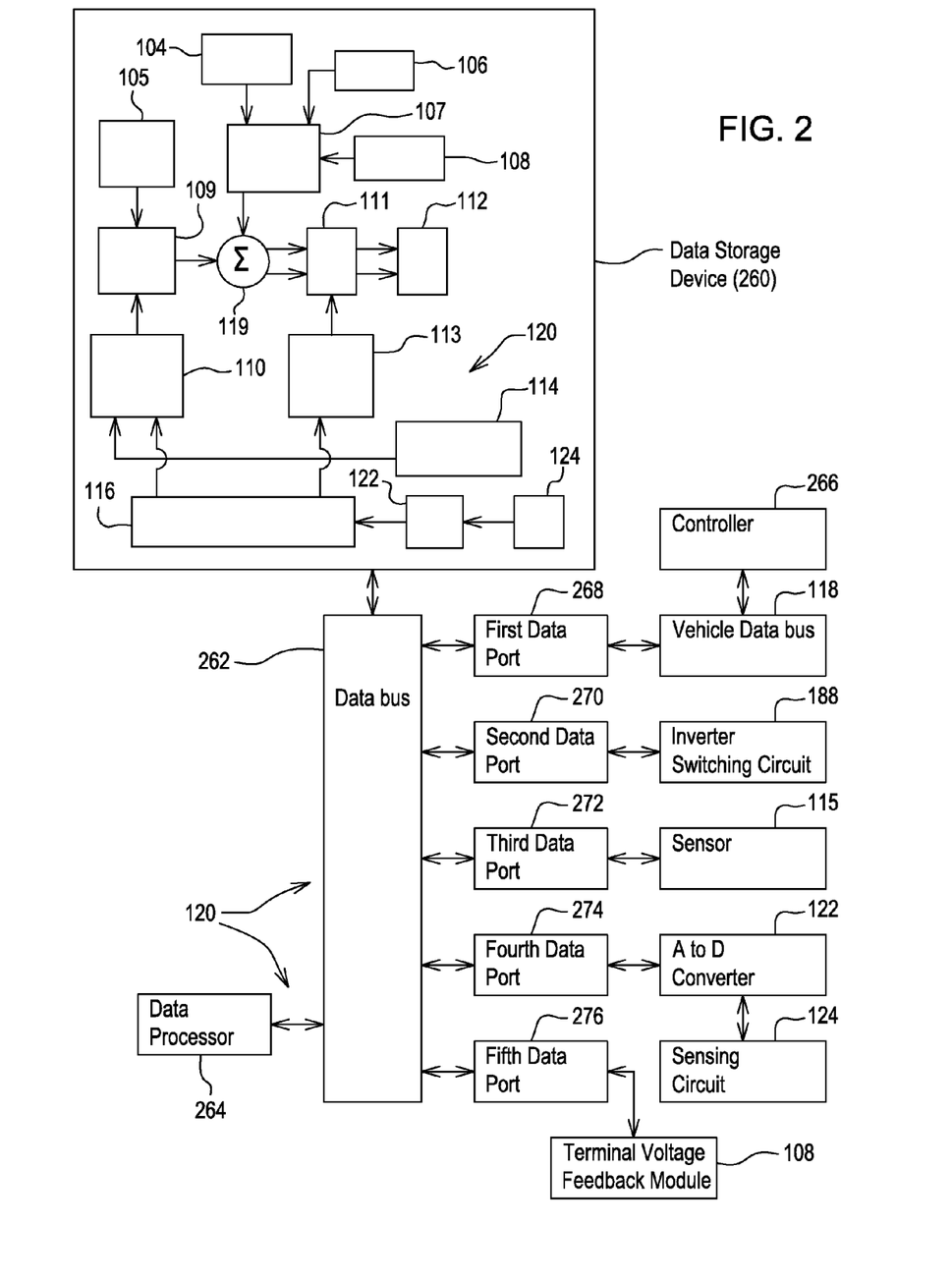
FIG. 2 is a block diagram of an electronic data processing system consistent with FIG. 1.

In FIG. 2, the electronic data processing system 120 comprises an electronic data processor 264, a data bus 262, a data storage device 260, and one or more data ports (268, 270, 272, 274 and 276). The data processor 264, the data storage device 260 and one or more data ports are coupled to the data bus 262 to support communications of data between or among the data processor 264, the data storage device 260 and one or more data ports.

In one embodiment, the data processor 264 may comprise one or more of the following electronic components: an electronic data processor, a microprocessor, a microcontroller, a programmable logic array, a field programmable gate array (FPGA), a logic circuit, an arithmetic logic unit, an application specific integrated circuit, a digital signal processor (DSP), a proportional-integral-derivative (PID) controller, or another data processing device. In one configuration, the above electronic components of the data processor 264 may be interconnected via one or more data buses, physical communication paths, or virtual communication paths.

The data storage device 260 may comprise any magnetic, electronic, or optical device for storing data. For example, the data storage device 260 may comprise an electronic data storage device, an electronic memory, non-volatile electronic random access memory, one or more electronic data registers, data latches, a magnetic disc drive, a hard disc drive, an optical disc drive, or the like.

As shown in FIG. 2, the data ports comprise a first data port 268, a second data port 270, a third data port 272, a fourth data port 274 and a fifth data port 276, although any suitable number of data ports may be used. Each data port may comprise a transceiver and buffer memory, for example. In one embodiment, each data port may comprise any serial or parallel input/output port.

In one embodiment as illustrated in FIG. 2, the first data port 268 is coupled to the vehicle data bus 118. In turn, the vehicle data bus 118 is coupled to the controller 266. In one configuration, the second data port 270 may be coupled to the inverter circuit 188; the third data port 272 may be coupled to the sensor 115; the fourth data port 274 may be coupled to the analog-to-digital converter 122; and the fifth data port 276 may be coupled to the terminal voltage feedback module 108. The analog-to-digital converter 122 is coupled to the sensing circuit 124.

In one embodiment of the data processing system 120, the torque command generation module 105 is associated with or supported by the first data port 268 of the electronic data processing system 120. The first data port 268 may be coupled to a vehicle data bus 118, such as a controller area network (CAN) data bus. The vehicle data bus 118 may provide data bus messages with torque commands to the torque command generation module 105 via the first data port 268. The operator of a vehicle may generate the torque commands via a user interface, such as a throttle, a pedal, a controller 266, or other control device.

In certain embodiments, the sensor 115 and the primary processing module 114 may be associated with or supported by a third data port 272 of the data processing system 120.

Figure 3:
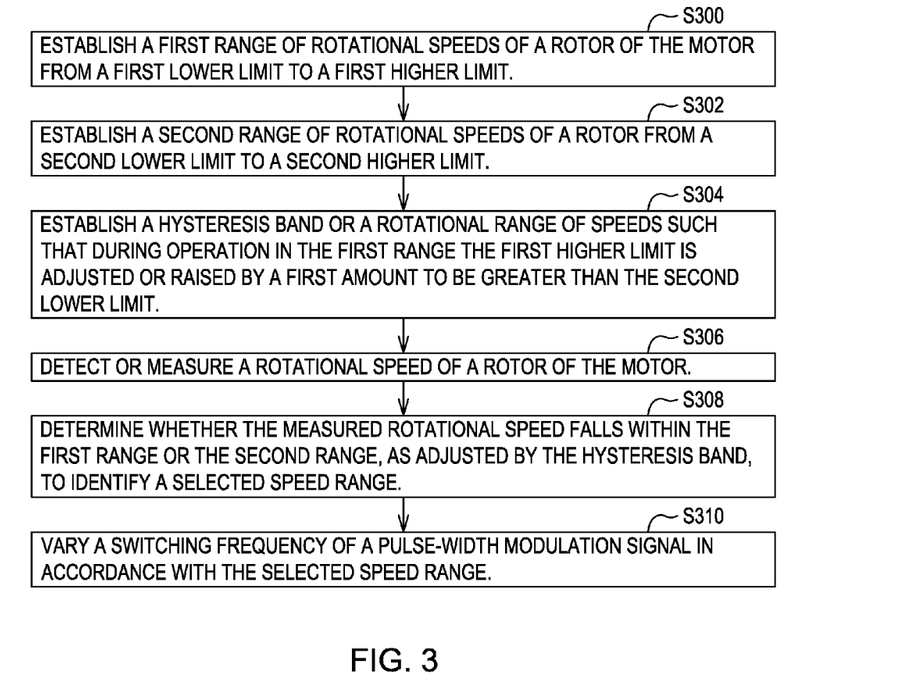
FIG. 3 is a flow chart of a first example of a method for controlling an electrical motor with variable speed control.

FIG. 3 discloses a first illustrative example of a method for controlling a motor (e.g., 117) with variable speed control. The method of FIG. 3 begins in step S300.

In step S300, a data processor 264 establishes a first range of rotational speeds of a rotor of the motor (e.g., 117) from a first lower limit to a first higher limit.

In step S302, the data processor 264 establishes a second range of rotational speeds of the rotor from a second lower limit to a second higher limit. The second range of rotational speeds may be generally contiguous to the first range of rotational speeds. In an alternative embodiment, the second range of rotational speeds may overlap with the first range of rotational speeds, for example.

In step S304, the data processor 264 establishes a hysteresis band or a rotational range of speeds such that during operation in the first range the first higher limit is adjusted or raised by a first amount to be greater than the second lower limit. Step S304 may be carried out in accordance with various techniques that may be applied alternately or cumulatively. Under a first technique, the data processor 264 establishes a hysteresis band or a rotational range of speeds such that during operation in the second range the second lower limit is lowered by a second amount to be less than the first higher limit. Under a second technique, the first amount is different than or less than the second amount. Under a third technique, the first amount is within a range of approximately fifty revolutions per minute to approximately one-hundred and twenty revolutions per minute.

In step S306, a sensor 115 detects or measures a rotational speed of a rotor of the motor (e.g., 117). For example, the sensor 115 may detect a measured rotational or angular position of the rotor from which the primary processing module 114 determines a rotational speed of the rotor.

In step S308, the data processor 264 or the primary positioning module determines whether the measured rotational speed falls within the first range or the second range, as adjusted by the hysteresis band, to identify a selected speed range.

In step S310, the pulse width modulation generation module 112 or the data processor 264 varies a switching frequency of a pulse-width-modulation (PWM) signal in accordance with the selected speed range. Accordingly, the pulse width modulation generation module 112 and the inverter switching circuit 188 dynamically adjust the switching frequency or PWM frequency outputted to the motor (e.g., 117) in response to a material change in the motor (e.g., 117) shaft 126 speed. A material change in the motor shaft 126 speed occurs where the motor (e.g., 117) changes from one speed range or one stage to another stage (e.g., an adjacent higher or lower range). In practice, the PWM switching frequency may be changed from 4 KHz to 3 MHz, or over another suitable frequency spectrum, over a full operational speed range of a motor (e.g., 117), for example.

Step S310 may be carried out in accordance with several techniques that may be applied separately or cumulatively. Under a first technique, the pulse width modulation generation module 112 or the data processor 264 varies the switching frequency consistent with a preferential switching frequency selected from a look-up table in accordance with the selected speed range and a previous speed range of the rotor, where the selected speed range is associated with a current speed interval and where the previous speed range is associated with a previous speed interval prior to the current speed interval.

Under a second technique, the pulse width modulation generation module 112 or the data processor 264 selects the switching frequency for a corresponding selected speed range to optimize the following phase current imbalance factor or ratio in accordance with the following expression:

$$\frac{\max(\text{abs}(i_{a\_rms} - i_{b\_rms}), \text{abs}(i_{b\_rms} - i_{c\_rms}), \text{abs}(i_{c\_rms} - i_{a\_rms}))}{\min(i_{a\_rms}, i_{b\_rms}, i_{c\_rms})},$$

where $i_{a\_rms}$ is root mean square current for phase a of measured three phase currents, $i_{b\_rms}$ is root mean square current for phase a of measured three phase currents, and $i_{c\_rms}$ is root mean square current for phase a of measured three phase currents. The above root mean square three phase currents may be available from the output of the secondary processing module 116 for example. The above phase current imbalance factor or a ratio can be optimized where it falls within a certain target range, or below a certain maximum ratio, for example.

Under a third technique, the pulse width modulation generation module 112 or the data processor selects the switching frequency for a corresponding selected speed range to maintain a desired frequency ratio for the motor (e.g., 117) in accordance with the following equation:

$$\text{frequency ratio} = \frac{PWM \text{ switching } freq}{\text{electrical fundamental } freq},$$

where the PWM switching freq is the pulse width modulation frequency or the maximum pulse with modulation frequency provided by the pulse width modulation generation module 112 or the inverter switching circuit 188, and where the electrical fundamental freq is the electrical fundamental frequency of a particular motor (e.g., 117) or machine design, which may depend upon the number of pole pairs or the motor (e.g., 117) inductance. If the motor (e.g., 117) comprises an IPM motor, the frequency ratio may be selected to be between approximately 10 and approximately 12, for example. Alternatively, if the motor (e.g., 117) comprises an IPM motor (e.g., 117), the frequency ratio may be selected to be greater than 10 for lower motor (e.g., 117) speed ranges and lower than 12 for higher speed ranges. If the motor (e.g., 117) is a coreless permanent magnet machine or an axial flux pancake motor (e.g., 117), the frequency ratio may be greater than or equal to 15.

Under a fourth technique, the data processor 264 or the pulse width modulation generation module 112 restricts the switching frequency from slot harmonic frequency defined as the product of a fundamental electrical frequency of the motor (e.g., 117) and the number of slots per pole pair of the motor (e.g., 117), where the fundamental electrical frequency is proportional to the rotational speed of the rotor.

Under a fifth technique, the data processor 264 or the pulse width modulation generation module 112 selects a switching frequency for a corresponding selected speed range to further optimize current ripple component in accordance with a shaft torque ripple and an electric machine efficiency requirement. For example, the data processor 264 or the pulse width modulation generation module 112 selects a switching frequency for a corresponding selected speed range to optimize a current ripple component in accordance with a minimizing shaft torque ripple or limiting shaft torque ripple to a maximum limit (e.g., a percentage limit with respect to one or more operating torque and corresponding speeds of the motor), a maximum standard deviation from an average torque ripple, or otherwise.

Figure 4:
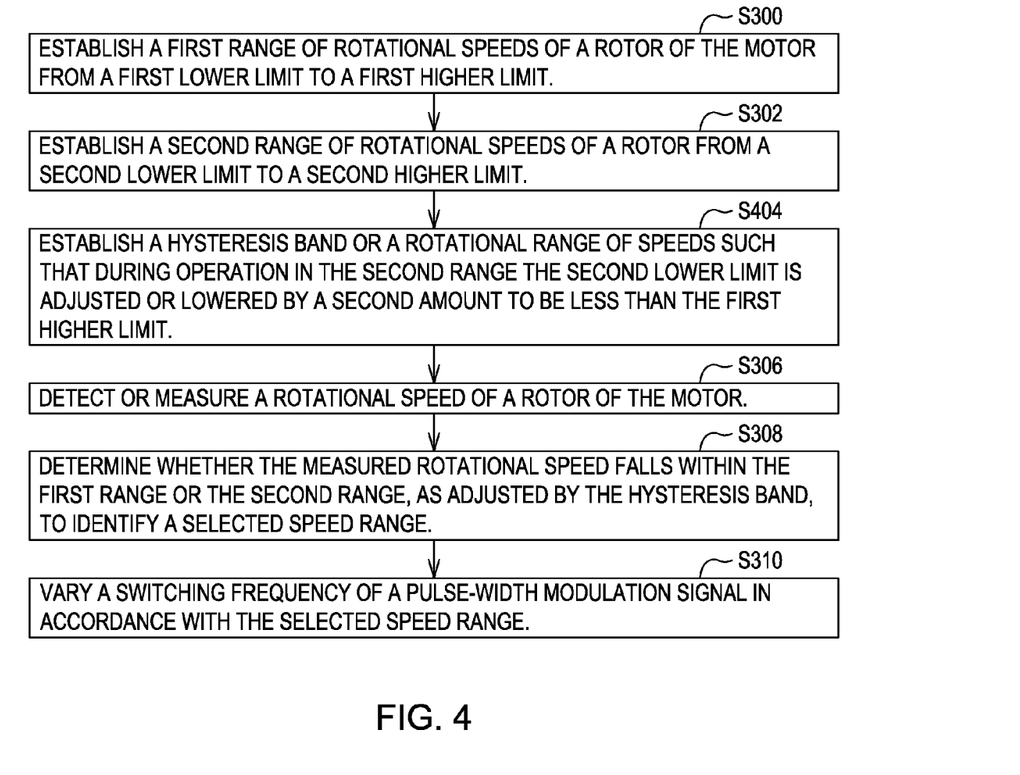
FIG. 4 is a flow chart of a second example of a method for controlling an electrical motor with variable speed control.

FIG. 4 discloses a second illustrative example of a method for controlling a motor (e.g., 117) with variable speed control. The method of FIG. 4 begins in step S300.

In step S300, a data processor 264 establishes a first range of rotational speeds of a rotor of the motor (e.g., 117) from a first lower limit to a first higher limit.

In step S302, the data processor 264 establishes a second range of rotational speeds of the rotor from a second lower limit to a second higher limit.

In step S404, the data processor 264 establishes a hysteresis band or a rotational range of speeds such that during operation in the second range the second lower limit is adjusted or lowered by a second amount to be less than the first higher limit. In one embodiment, the data processor 264 sets or can set the first higher limit equal to the second lower limit, subject to adjustment by the hysteresis band in this step S404 or otherwise.

In step S306, a sensor 115 detects or measures a rotational speed of a rotor of the motor (e.g., 117). For example, the sensor 115 may detect a measured rotational or angular position of the rotor from which the primary processing module 114 determines a rotational speed of the rotor.

In step S308, the data processor 264 or the primary positioning module determines whether the measured rotational speed falls within the first range or the second range, as adjusted by the hysteresis band, to identify a selected speed range.

In step S310, the pulse width modulation generation module 112 or the data processor 264 varies a switching frequency of a pulse-width modulation signal in accordance with the selected speed range. Accordingly, the pulse width modulation generation module 112 and the inverter switching circuit 188 dynamically adjust the switching frequency or PWM frequency outputted to the motor (e.g., 117) in response to a material change in the motor (e.g., 117) shaft 126 speed. A material change in the motor shaft 126 speed occurs where the motor (e.g., 117) changes from one speed range or one stage to another stage (e.g., an adjacent higher or lower range). In practice, the PWM switching frequency may be changed from 4 KHz to 3 MHz, or over another suitable frequency spectrum, over a full operational speed range of a motor (e.g., 117), for example.

Step S310 may be carried out in accordance with several techniques that may be applied separately or cumulatively. Under a first technique, the pulse width modulation generation module 112 or the data processor 264 varies the switching frequency consistent with a preferential switching frequency selected from a look-up table in accordance with the selected speed range and a previous speed range of the rotor, where the selected speed range is associated with a current speed interval and where the previous speed range is associated with a previous speed interval prior to the current speed interval.

Under a second technique, the pulse width modulation generation module 112 or the data processor 264 selects the switching frequency for a corresponding selected speed range to optimize a phase current imbalance factor or ratio in accordance with the following expression:

$$\frac{\max(\text{abs}(i_{a\_rms} - i_{b\_rms}), \text{abs}(i_{b\_rms} - i_{c\_rms}), \text{abs}(i_{c\_rms} - i_{a\_rms}))}{\min(i_{a\_rms}, i_{b\_rms}, i_{c\_rms})}$$

Where $i_{a\_rms}$ is root mean square current for phase a of measured three phase currents, $i_{b\_rms}$ is root mean square current for phase a of measured three phase currents, and $i_{c\_rms}$ is root mean square current for phase a of measured three phase currents. The above root mean square three phase currents may be available from the output of the secondary processing module 116 for example. The above phase current imbalance factor or a ratio can be optimized where it falls within a certain target range, or below a certain maximum ratio, for example.

Under a third technique, the pulse width modulation generation module 112 or the data processor 264 selects the switching frequency for a corresponding selected speed range to maintain a desired frequency ratio for the motor (e.g., 117) in accordance with the following equation:

$$\text{frequency ratio} = \frac{PWN \text{ switching } freq}{\text{electrical fundamental } freq}$$

where the PWM switching freq is the pulse width modulation frequency or the maximum pulse with modulation frequency provided by the pulse width modulation generation module 112 or the inverter switching circuit 188, and where the electrical fundamental freq is the electrical fundamental frequency of a particular motor (e.g., 117) or machine design, which may depend upon the number of pole pairs or the motor (e.g., 117) inductance. If the motor (e.g., 117) comprises an IPM motor, the frequency ratio may be selected to be between approximately 10 and approximately 12, for example. Alternatively, if the motor (e.g., 117) comprises an IPM motor (e.g., 117), the frequency ratio may be selected to be greater than 10 for lower motor (e.g., 117) speed ranges and lower than 12 for higher speed ranges. If the motor (e.g., 117) is a coreless permanent magnet machine or an axial flux pancake motor (e.g., 117), the frequency ratio may be greater than or equal to 15.

Under a fourth technique, the data processor 264 or the pulse width modulation generation module 112 restricts the switching frequency from slot harmonic frequency defined as the product of a fundamental electrical frequency of the motor (e.g., 117) and the number of slots per pole pair of the motor (e.g., 117), where the fundamental electrical frequency is proportional to the rotational speed of the rotor.

Figure 5:
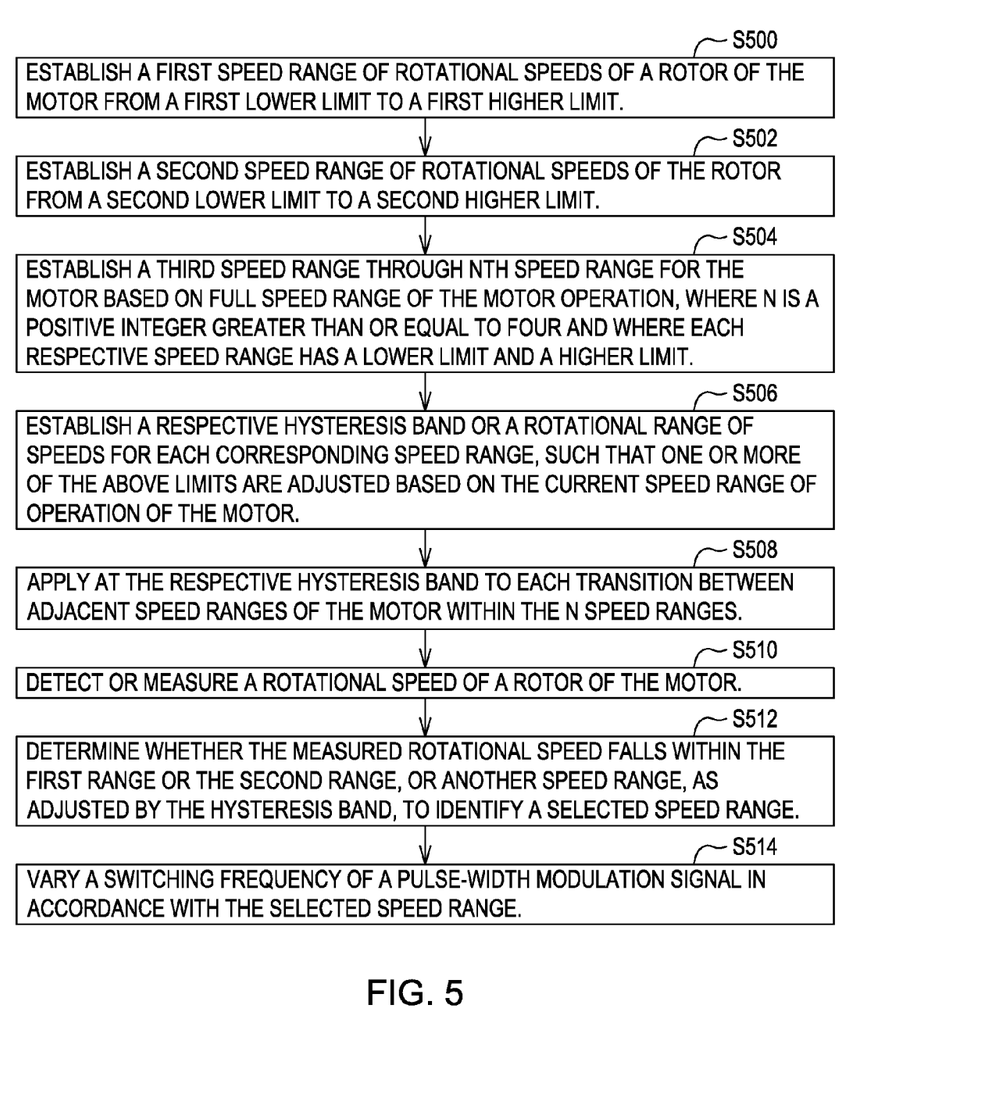
FIG. 5 is a flow chart of a third example of a method for controlling an electrical motor with variable speed control.

FIG. 5 discloses a third illustrative example of a method for controlling a motor (e.g., 117) with variable speed control. The method of FIG. 5 begins in step S500.

In step S500, a data processor 264 establishes a first speed range of rotational speeds of a rotor of the motor (e.g., 117) from a first lower limit to a first higher limit.

In step S502, the data processor 264 establishes a second speed range of rotational speeds of the rotor from a second lower limit to a second higher limit.

In step S504, the data processor 264 establishes or constructs a third speed range through an Nth speed range for the motor (e.g., 117) based on full speed range of the motor (e.g., 117) operation, where N is a positive integer greater than or equal to four and where each respective speed range has a lower limit and a higher limit. In one configuration, the full speed range of the motor (e.g., 117) operation ranges from approximately zero revolutions per minute to greater than or equal to 4,000 revolutions per minute.

In one illustrative example, where N is equal to six, the following pairs of respective speed stages (or nominal speed ranges) and corresponding speed ranges apply:

Speed stage 0 corresponds to a first nominal speed range 0 rpm-1000 rpm;

Speed stage 1 corresponds to a second nominal speed range 1000 rpm-2000 rpm;

Speed stage 2 corresponds to third nominal speed range 2000 rpm-3000 rpm;

Speed stage 3 corresponds to fourth nominal speed range 3000 rpm-4000 rpm;

Speed stage 4 corresponds to fifth nominal speed range 4000 rpm-5000 rpm; and

Speed stage 5 corresponds to sixth nominal speed range 5000 rpm-6000 rpm, where rpm means revolutions of the motor (e.g., 117) shaft 126 per minute.

In step S506, the data processor 264 establishes a respective hysteresis band or a rotational range of speeds for each corresponding speed range, such that one or more of the above limits are adjusted based on the current speed range of operation of the motor (e.g., 117). Step S506 may be executed in accordance with various procedures that may be applied alternately or cumulatively. Under a first procedure, hysteresis speed band is set at the boundary of two adjacent speed intervals such that the first upper limit of the first range is higher than a second lower limit of the second range to avoid jitter or abrupt discontinuities in a change between selected switching frequencies during a series of successive intervals.

Under a second procedure, the data processor 264 accesses an upper limit and a lower limit for a previous step selected speed range. The data processor 264 may determine a current speed range based on the current measured speed, where the accessed upper limit added by the hysteresis band and the accessed lower limit subtracted by the hysteresis band.

Under a third procedure, at each boundary between adjacent speed stages (e.g., Stage 0 through Stage 5, inclusive) or adjacent speed ranges, the data processor 264 establishes or defines a fixed hysteresis speed band (e.g., 100 rpm) that can adjust the boundaries of the above speed range or speed stage. For each hysteresis speed band, the values or amounts may be different or the same for low end point of a higher speed range and a high end point of a lower speed range. Although the above speed ranges are used, any suitable speed range boundaries or number of ranges can be used that are consistent with the machine application.

During operation of the motor (e.g., 117), in one illustrative example, if the stage number in previous control iteration has been determined to be Stage 3, then the controller looks for its corresponding nominal low end and high end points of Stage 3—3000 rpm and 4000 rpm. Then, in the current control iteration, if the hysteresis amount is 100 rpm, the low end point is calculated as 3000−100=2900 rpm and the high end point is calculated 4000+100=4100 rpm. The nominal end points, 3000 rpm and 4000 rpm, for stage 3, are modified or adjusted by the hysteresis band to determine newly calculated end points, 2900 rpm and 4100 rpm, for stage 3, for example.

In step S508, the data processor 264 applies the respective hysteresis band to each transition between adjacent speed ranges of the motor (e.g., 117) within the N speed ranges. Step S508 may be explained with reference to the above example, where the motor (e.g., 117) and data processing system are operating in Stage 3. If the detected speed in current control iteration is between 2900 rpm and 4100 rpm, then the Stage number is 3 in current control iteration with consideration of the 100 rpm adjustment from the application for the hysteresis band to the nominal end points (e.g., 3000 rpm to 4,000 rpm) of the speed range of Stage 3. However, if the detected speed in current control iteration is below 2900 pm, then the stage number becomes Stage 2 in current control iteration. If the detected speed in current control iteration is above 4100 rpm, then the stage number becomes Stage 4 in current control iteration.

In step S510, the sensor 115 detects or measures a rotational speed of the rotor of the motor (e.g., 117).

In step S512, the data processor 264 determines whether the measured rotational speed falls within the first range or the second range, or another speed range, as adjusted by the hysteresis band, to identify a selected speed range. In one embodiment, if the measured speed of the motor (e.g., 117) shaft 126 is greater than an upper speed limit (adjusted for the hysteresis band) corresponding to a previous operational stage number, then the current operational stage number is the previous operational stage number plus one. However, if the measured speed of the motor (e.g., 117) shaft 126 is less than the lower speed limit (as adjusted by the hysteresis band) corresponding to the previous operational stage, then the current operational stage number is the previous stage number minus one. If the measured speed is within the above two boundaries (e.g., upper speed limit and the lower speed limit), as adjusted by hysteresis, for a current operational stage, then the current operational stage number is the same as the previous operational stage number.

In step S514, the data processor 264 varies a switching frequency of the pulse-width modulation signal in accordance with the selected speed range. For example, based on the determined stage number in every control iteration, proper PWM switching frequency as well current regulation loop PI gains are selected for that particular stage.

Figure 6:
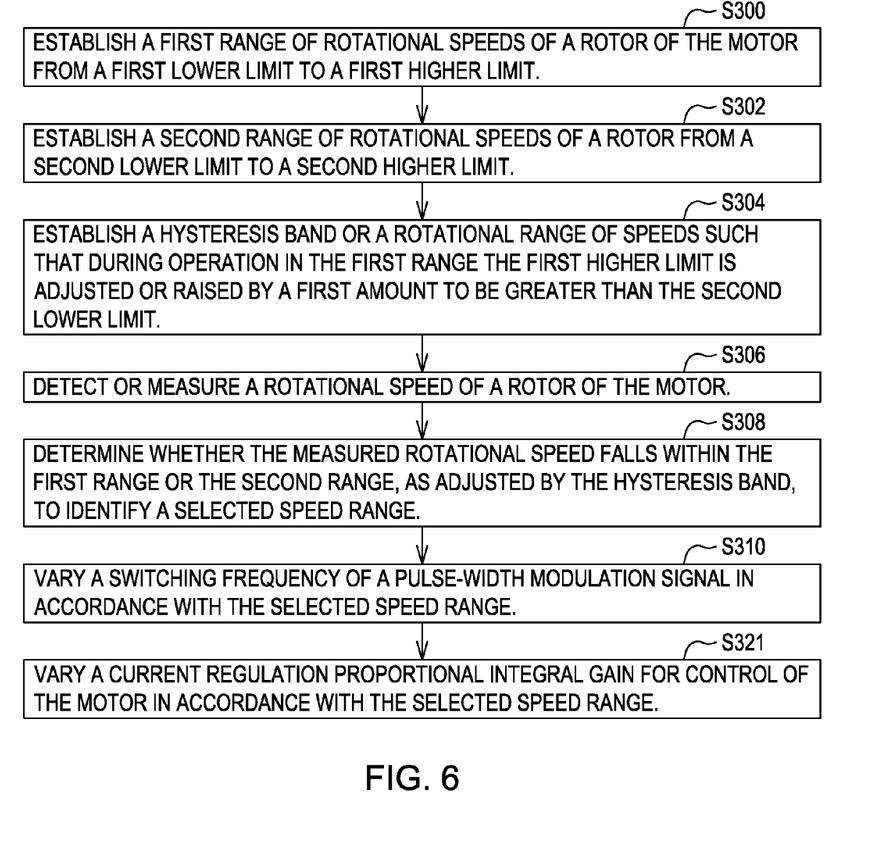
FIG. 6 is a flow chart of a fourth example of a method for controlling an electrical motor with variable speed control.

FIG. 6 discloses a first illustrative example of a method for controlling a motor (e.g., 117) with variable speed control. The method of FIG. 6 begins in step S300.

In step S300, a data processor 264 establishes a first range of rotational speeds of a rotor of the motor (e.g., 117) from a first lower limit to a first higher limit.

In step S302, the data processor 264 establishes a second range of rotational speeds of the rotor from a second lower limit to a second higher limit.

In step S304, the data processor 264 establishes a hysteresis band or a rotational range of speeds such that during operation in the first range the first higher limit is adjusted or raised by a first amount to be greater than the second lower limit.

In step S306, a sensor 115 detects or measures a rotational speed of a rotor of the motor (e.g., 117). For example, the sensor 115 may detect a measured rotational or angular position of the rotor from which the primary processing module 114 determines a rotational speed of the rotor.

In step S308, the data processor 264 or the primary positioning module determines whether the measured rotational speed falls within the first range or the second range, as adjusted by the hysteresis band, to identify a selected speed range.

In step S310, the pulse width modulation generation module 112 or the data processor 264 varies a switching frequency of a pulse-width modulation signal in accordance with the selected speed range. Accordingly, the pulse width modulation generation module 112 and the inverter switching circuit 188 dynamically adjust the switching frequency or PWM frequency outputted to the motor (e.g., 117) in response to a material change in the motor (e.g., 117) shaft 126 speed. A material change in the motor shaft 126 speed occurs where the motor (e.g., 117) changes from one speed range or one stage to another stage (e.g., an adjacent higher or lower range). In practice, the PWM switching frequency may be changed from 4 KHz to 3 MHz, or over another suitable frequency spectrum, over a full operational speed range of a motor (e.g., 117), for example.

Step S310 may be carried out in accordance with several techniques that may be applied separately or cumulatively. Under a first technique, the pulse width modulation generation module 112 or the data processor 264 varies the switching frequency consistent with a preferential switching frequency selected from a look-up table in accordance with the selected speed range and a previous speed range of the rotor, where the selected speed range is associated with a current speed interval and where the previous speed range is associated with a previous speed interval prior to the current speed interval.

Under a second technique, the pulse width modulation generation module 112 or the data processor 264 selects the switching frequency for a corresponding selected speed range to optimize a phase current imbalance factor or ratio in accordance with the following expression:

$$\frac{\max(\text{abs}(i_{a\_rms} - i_{b\_rms}), \text{abs}(i_{b\_rms} - i_{c\_rms}), \text{abs}(i_{c\_rms} - i_{a\_rms}))}{\min(i_{a\_rms}, i_{b\_rms}, i_{c\_rms})}$$

Where $i_{a\_rms}$ is root mean square current for phase a of measured three phase currents, $i_{b\_rms}$ is root mean square current for phase a of measured three phase currents, and $i_{c\_rms}$ is root mean square current for phase a of measured three phase currents. The above root mean square three phase currents may be available from the output of the secondary processing module 116 for example. The above phase current imbalance factor or a ratio can be optimized where it falls within a certain target range, or below a certain maximum ratio, for example.

Under a third technique, the pulse width modulation generation module 112 or the data processor selects the switching frequency for a corresponding selected speed range to maintain a desired frequency ratio for the motor (e.g., 117) in accordance with the following equation:

$$\text{frequency ratio} = \frac{PWN \text{ switching } freq}{\text{electrical fundamental } freq}$$

where the PWM switching freq is the pulse width modulation frequency or the maximum pulse with modulation frequency provided by the pulse width modulation generation module 112 or the inverter switching circuit 188, and where the electrical fundamental freq is the electrical fundamental frequency of a particular motor (e.g., 117) or machine design, which may depend upon the number of pole pairs or the motor (e.g., 117) inductance. If the motor (e.g., 117) comprises an IPM motor (e.g., 117), the frequency ratio may be selected to be between approximately 10 and approximately 12, for example. Alternatively, if the motor (e.g., 117) comprises an IPM motor (e.g., 117), the frequency ratio may be selected to be greater than 10 for lower motor (e.g., 117) speed ranges and lower than 12 for higher speed ranges. If the motor (e.g., 117) is a coreless permanent magnet machine or an axial flux pancake motor (e.g., 117), the frequency ratio may be greater than or equal to 15.

Under a fourth technique, the data processor 264 or the pulse width modulation generation module 112 restricts the switching frequency from slot harmonic frequency defined as the product of a fundamental electrical frequency of the motor (e.g., 117) and the number of slots per pole pair of the motor (e.g., 117), where the fundamental electrical frequency is proportional to the rotational speed of the rotor.

In step S321, the pulse width modulation generation module 112, the current regulation controller 111, or the data processor 264 varies a current regulation proportional integral gain for control of the motor (e.g., 117) in accordance with the selected speed range.

The method and system disclosed herein is well suited for controlling motors with suitable peak or maximum frequencies for pulse width modulation switching frequencies that reduces inverter switching losses, avoids reduction in inverter life from thermal impact, and reduces or manages the data processing burden of the data processor 264 or digital signal processor within the inverter. Thus, the method and system for controlling an electric motor with speed control facilitates selection of a balanced or optimum pulse width modulation frequency for the inverter. By adjusting the switching frequency of the motor through the motor shaft speed range, the inverter switching losses can be decreased, while maintaining efficiency at lower speed ranges. Further, the inverter of the method and system disclosed herein can provide generally high current levels over a broad range of motor shaft speeds than otherwise possible for a fixed switching frequency of the inverter.

Having described the preferred embodiment, it will become apparent that various modifications can be made without departing from the scope of the invention as defined in the accompanying claims.

The following is claimed:

1. A method for controlling a motor, the method comprising:
   establishing a first range of rotational speeds of a rotor of the motor from a first lower limit to a first higher limit;
   establishing a second range of rotational speeds of the rotor from a second lower limit to a second higher limit;
   establishing a hysteresis band or a rotational range of speeds such that during operation in the first range the first higher limit is adjusted or raised by a first amount to be greater than the second lower limit;
   detecting or measuring a rotational speed of a rotor of the motor;
   determining whether the measured rotational speed falls within the first range or the second range, as adjusted by the hysteresis band, to identify a selected speed range; and
   varying a switching frequency of a pulse-width modulation signal in accordance with the selected speed range.

2. The method according to claim 1 further comprising:
   establishing a hysteresis band or a rotational range of speeds such that during operation in the second range the second lower limit is lowered by a second amount to be less than the first higher limit.

3. The method according to claim 2 wherein the first amount is different than or less than the second amount.

4. The method according to claim 1 wherein the first amount is within a range of approximately fifty revolutions per minute to approximately one-hundred and twenty revolutions per minute.

5. The method according to claim 1 further comprising:
   setting the first higher limit equal to the second lower limit, subject to adjustment by the hysteresis band.

6. The method according to claim 1 further comprising:
   constructing a third speed range through Nth speed range for the motor based on full speed range of the motor operation, where N is an positive integer greater than or equal to four; and
   applying one or more hysteresis bands to each transition between adjacent speed ranges of the motor within the N speed ranges.

7. The method according to claim 6 wherein the full speed range of the motor operation ranges from approximately zero revolutions per minute to greater than or equal to 4,000 revolutions per minute.

8. The method according to claim 1 wherein the varying of the switching frequency comprises varying the switching frequency consistent with a preferential switching frequency selected from a look-up table in accordance with the selected speed range and a previous speed range of the rotor, where the selected speed range is associated with a current speed interval and where the previous speed range is associated with a previous speed interval prior to the current speed interval.

9. The method according to claim 1 wherein the switching frequency for a corresponding selected speed range is selected to optimize a phase current imbalance factor or ratio in accordance with the following expression:

$$\frac{\max(\text{abs}(i_{a\_rms} - i_{b\_rms}), \text{abs}(i_{b\_rms} - i_{c\_rms}), \text{abs}(i_{c\_rms} - i_{a\_rms}))}{\min(i_{a\_rms}, i_{b\_rms}, i_{c\_rms})},$$

where $i_{a\_rms}$ is root mean square current for phase a of measured three phase currents, $i_{b\_rms}$ is root mean square current for phase b of measured three phase currents, and $i_{c\_rms}$ is root mean square current for phase c of measured three phase currents.

10. The system according to claim 1 wherein the switching frequency for a corresponding selected speed range is selected to further optimize current ripple component in accordance with a shaft torque ripple and an electric machine efficiency requirement.

11. The method according to claim 1 wherein the switching frequency for a corresponding selected speed range is selected to maintain a desired frequency ratio for the motor in accordance with the following equation:

$$\text{frequency ratio} = \frac{PWM \text{ switching } freq}{\text{electrical fundamental } freq}$$

where the PWM switching freq is the pulse width modulation frequency, and where the electrical fundamental freq is the electrical fundamental frequency of the motor.

12. The method according to claim 1 wherein the switching frequency is restricted from slot harmonic frequency defined as the product of a fundamental electrical frequency of the motor and the number of slots per pole pair of the motor, where the fundamental electrical frequency is proportional to the rotational speed of the rotor.

13. The method according to claim 1 wherein a hysteresis speed band is set at the boundary of two adjacent speed intervals such that the first upper limit of the first range is higher than a second lower limit of the second range to avoid jitter or abrupt discontinuities in a change between selected switching frequencies during a series of successive intervals.

14. The method according to claim 1 further comprising:
accessing an upper limit and a lower limit for a previous step selected speed range;
determining a current speed range based on the current measured speed, the accessed upper limit added by the hysteresis band and the accessed lower limit subtracted by the hysteresis band.

15. The method according to claim 1 further comprising:
varying a current regulation proportional and integral gains in accordance with the selected speed range.

16. A system for controlling a motor, the system comprising:
a data storage device for storing a first range of rotational speeds of a rotor of the motor from a first lower limit to a first higher limit, the data storage device arranged to store a second range of rotational speeds of the rotor from a second lower limit to a second higher limit;
a data processor for establishing a hysteresis band or a rotational range of speeds such that during operation in the first range the first higher limit is adjusted or raised by a first amount to be greater than the second lower limit;
a sensor for detecting or measuring a rotational speed of a rotor of the motor;
the data processor adapted to determine whether the measured rotational speed falls within the first range or the second range, as adjusted by the hysteresis band, to identify a selected speed range; and
a pulse width modulation generation module for varying a switching frequency of a pulse-width modulation signal in accordance with the selected speed range.

17. The system according to claim 16 further comprising:
the data processor configuring or controlling the hysteresis band or a rotational range of speeds such that during operation in the second range the second lower limit is lowered by a second amount to be less than the first higher limit.

18. The system according to claim 16 wherein the first amount is less than the second amount.

19. The system according to claim 16 wherein the switching frequency for a corresponding selected speed range is selected to optimize a phase current imbalance factor in accordance with the following equation:

$$\frac{\max(\text{abs}(i_{a\_rms} - i_{b\_rms}), \text{abs}(i_{b\_rms} - i_{c\_rms}), \text{abs}(i_{c\_rms} - i_{a\_rms}))}{\min(i_{a\_rms}, i_{b\_rms}, i_{c\_rms})}$$

where $i_{a\_rms}$ is root mean square current for phase a of measured three phase currents, $i_{b\_rms}$ is root mean square current for phase b of measured three phase currents, and $i_{c\_rms}$ is root mean square current for phase c of measured three phase currents.

20. The system according to claim 16 wherein the switching frequency for a corresponding selected speed range is selected to further optimize current ripple component in accordance with a shaft torque ripple and an electric machine efficiency requirement.

21. The system according to claim 16 wherein the switching frequency for a corresponding selected speed range is selected to maintain a desired frequency ratio for the motor in accordance with the following equation:

$$\text{frequency ratio} = \frac{PWN \text{ switching } freq}{\text{electrical fundamental } freq},$$

where the PWM switching freq is the pulse width modulation frequency, and where the electrical fundamental freq is the electrical fundamental frequency of the motor.

22. The system according to claim 16 wherein the switching frequency is restricted from slot harmonic frequency defined as the product of a fundamental electrical frequency of the motor and the number of slots per pole pair of the motor, where the fundamental electrical frequency is proportional to the rotational speed of the rotor.

* * * * *